(12) United States Patent
Morii et al.

(10) Patent No.: US 10,649,254 B2
(45) Date of Patent: May 12, 2020

(54) DISPLAY

(71) Applicant: Mitsubishi Electric Corporation, Tokyo (JP)

(72) Inventors: Yasuhiro Morii, Tokyo (JP); Yoshimitsu Ishikawa, Tokyo (JP); Masayuki Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 15/574,548

(22) PCT Filed: Jun. 29, 2016

(86) PCT No.: PCT/JP2016/069307
§ 371 (c)(1),
(2) Date: Nov. 16, 2017

(87) PCT Pub. No.: WO2017/010291
PCT Pub. Date: Jan. 19, 2017

(65) Prior Publication Data
US 2018/0157089 A1 Jun. 7, 2018

(30) Foreign Application Priority Data
Jul. 13, 2015 (JP) .................................. 2015-139385

(51) Int. Cl.
*G02F 1/1333* (2006.01)
*G02F 1/1335* (2006.01)
*G02F 1/1343* (2006.01)

(52) U.S. Cl.
CPC ...... *G02F 1/133308* (2013.01); *G02F 1/1335* (2013.01); *G02F 1/134363* (2013.01);
(Continued)

(58) Field of Classification Search
CPC ... G02F 2001/133331; G02F 1/133308; G02F 2001/133314; G02F 1/134363; G02F 2001/134372; G02F 1/1335
See application file for complete search history.

(56) References Cited

U.S. PATENT DOCUMENTS

2010/0182524 A1* 7/2010 Nomura ............ G02F 1/133308
349/40
2011/0261282 A1* 10/2011 Jean .................. G02F 1/133308
349/58
(Continued)

FOREIGN PATENT DOCUMENTS

JP  2006-139100 A  6/2006
JP  2008-197218 A  8/2008
(Continued)

OTHER PUBLICATIONS

International Preliminary Report on Patentability issued in PCT/JP2016/069307; dated Jan. 16, 2018.
(Continued)

*Primary Examiner* — Jia X Pan
(74) *Attorney, Agent, or Firm* — Studebaker & Brackett PC

(57) ABSTRACT

Provided is a display that causes an electric field generated in a transverse or diagonal direction to drive liquid crystals and enables allocation of a contact area for a conducting connection. A transparent electrode layer is formed on a surface of a counter substrate that is opposite to a surface of the counter substrate on which the liquid crystals are disposed. The counter substrate is included in a liquid-crystal display panel. An electrode layer is formed on the rear surface of a protective plate disposed to face the counter electrode. Conductive substances are disposed between the transparent electrode layer and the electrode layer to connect the transparent electrode layer to the electrode layer. A GND
(Continued)

connecting part provided in a surrounding area of the protective plate connects the electrode layer formed on the protective plate to, for example, a casing, thus connecting the electrode layer to the GND.

5 Claims, 5 Drawing Sheets

(52) U.S. Cl.
CPC ............ *G02F 2001/133314* (2013.01); *G02F 2001/133331* (2013.01); *G02F 2001/134372* (2013.01)

(56) References Cited

U.S. PATENT DOCUMENTS

| | | | | |
|---|---|---|---|---|
| 2011/0261283 A1* | 10/2011 | Kim | ................ | G03B 17/02 349/58 |
| 2011/0285640 A1* | 11/2011 | Park | ................ | G02F 1/13338 345/173 |
| 2013/0027629 A1* | 1/2013 | Kiyohara | ......... | G02F 1/133308 349/58 |
| 2013/0321293 A1* | 12/2013 | Park | ................ | G06F 3/041 345/173 |
| 2015/0002779 A1* | 1/2015 | Joten | ................ | G02F 1/133308 349/59 |
| 2015/0168767 A1* | 6/2015 | Yonemura | ........ | G02F 1/133308 349/58 |
| 2016/0161813 A1* | 6/2016 | Lee | ................ | G02F 1/133308 349/12 |
| 2017/0038515 A1* | 2/2017 | Yuki | ................ | G02B 6/0036 |
| 2017/0160581 A1* | 6/2017 | Matsuoka | ........ | G02F 1/133345 |

FOREIGN PATENT DOCUMENTS

| | | |
|---|---|---|
| JP | 2008-203591 A | 9/2008 |
| JP | 2008-209468 A | 9/2008 |
| JP | 2015-027752 A | 2/2015 |
| WO | 2014/061478 A1 | 4/2014 |
| WO | WO-2014061478 A1 * | 4/2014 ............ G02F 1/1333 |

OTHER PUBLICATIONS

International Search Report issued in PCT/JP2016/069307; dated Sep. 20, 2016.

* cited by examiner

F I G . 3
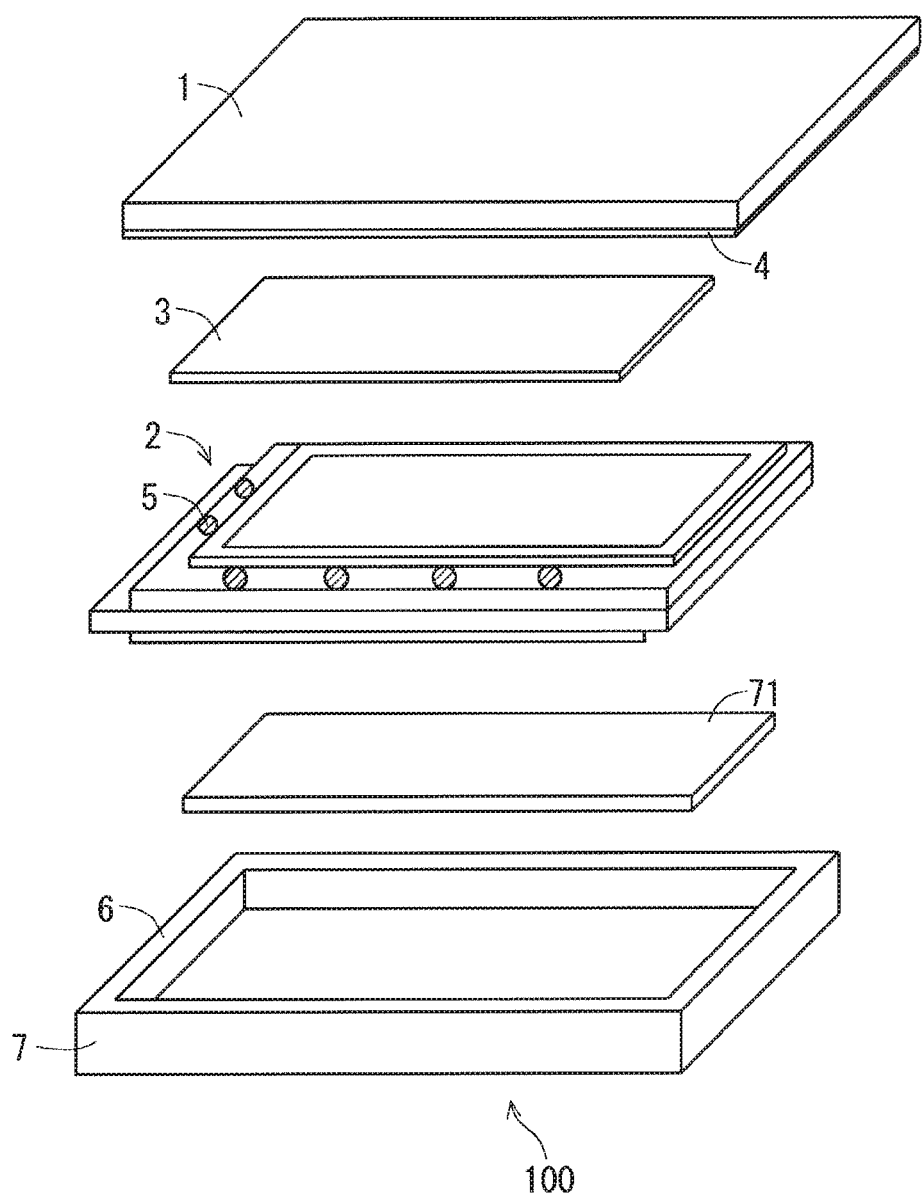

F I G . 8
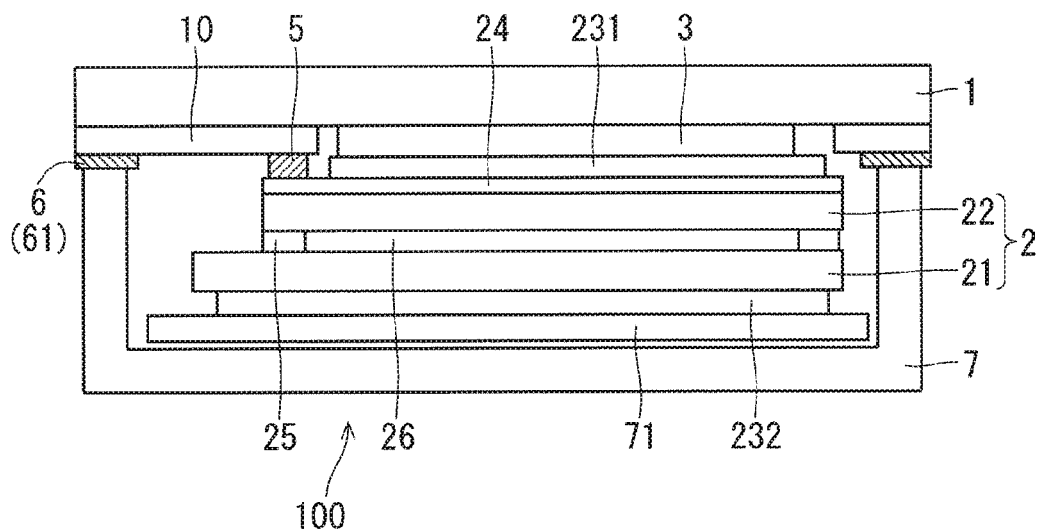
F I G . 9
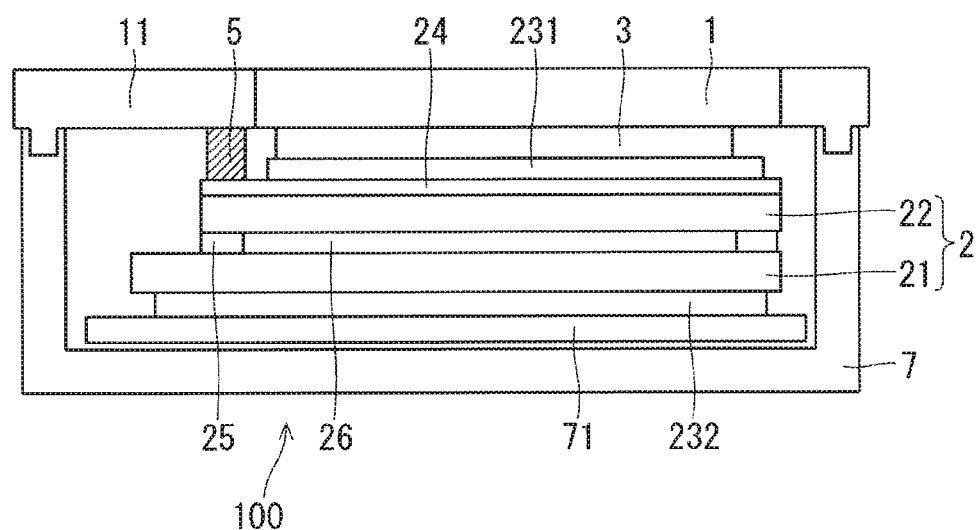

DISPLAY

TECHNICAL FIELD

The present invention relates to a display including a liquid-crystal display panel, and the display including a protective plate on a display surface side.

BACKGROUND ART

Some smartphones and tablet PCs each with a display include, on a display screen, a protective plate such as a glass plate or a transparent plastic plate. Here, optical bonding for bonding the protective plate with, for example, an adhesive made of a transparent resin may be adopted to improve its design and display characteristics.

The displays include, for example, a liquid-crystal display panel. The liquid-crystal display panel contains liquid crystals between a thin-film transistor (hereinafter referred to as "TFT") substrate and a counter substrate that is disposed to face the TFT substrate. The TFT substrate is obtained by forming TFTs that are switching elements. Recent liquid-crystal display panels have adopted an in-plane switching mode or a fringe-field switching mode with wide viewing angle characteristics. In the in-plane switching mode or the fringe-field switching mode, an electric field generated in a transverse or diagonal direction allows liquid crystals to move in a plane of a substrate with an array of TFTs. Since electrodes that drive the liquid crystals are collectively formed on the TFT substrate in these modes, the counter substrate does not need any electrode for driving the liquid crystals.

However, application of electrical noise such as static electricity to a surface of the counter substrate that is not in contact with the liquid crystals in the in-plane switching mode or the fringe-field switching mode creates a problem of causing the liquid crystals to respond to the noise and thus displaying an irregular image. To address this problem, a structure of dissipating electric charges has been used by forming a transparent electrode made of, for example, a transparent substance (for example, indium tin oxide hereinafter referred to as "ITO") on a surface of a counter substrate that is not in contact with liquid crystals and connecting the transparent electrode to GND of the system.

Patent Document 1 describes, as a conventional method, a structure of connecting a transparent electrode disposed on a counter substrate to a conductor and GND of a circuit board. In a display described in Patent Document 1, a transparent conductive film is formed on the surface of a transparent cover glass, and a liquid-crystal display panel is housed in a casing. Ground connection of the transparent conductive film through a conductive film formed in the casing creates a structure of dissipating electric charges accumulated in the transparent cover glass toward the casing.

Patent Document 2 describes a structure of connecting a transparent electrode of a counter substrate to a ground line provided on a TFT substrate via a conductive paste. In a display of Patent Document 2, a structure of forming a transparent conductive layer on the rear surface of a transparent plate disposed on the top surface of the counter substrate to shield a pair of the substrates by the transparent conductive layer is disclosed, which allows static electricity to flow from the transparent conductive layer toward the ground of a circuit board through a conductor and a metal line without the static electricity being accumulated in liquid crystal cells.

PRIOR-ART DOCUMENTS

Patent Documents

Patent Document 1: Japanese Patent Application Laid-Open No. 2008-203591
Patent Document 2: Japanese Patent Application Laid-Open No. 2008-197218

SUMMARY

Problems to be Solved by the Invention

Although the display described in Patent Document 1 or 2 has a structure of forming a conductive film on a transparent plate or a transparent cover glass to allow external electric charges to flow, the electric charges generated and electrified when a liquid-crystal display panel of the in-plane switching mode is manufactured or used cannot be dissipated. Moreover, the display described in Patent Document 1 requires allocation of an area for forming a metal line on a TFT substrate with many design constraints. The display also has a problem with reliability in connection when the product is manufactured or used, due to its structure for a conducting connection in a narrow area.

The present invention has been conceived to solve such problems, and provides a display that causes an electric field generated in a transverse or diagonal direction to drive liquid crystals and enables (i) formation of a conducting connection capable of dissipating static electricity generated in a liquid-crystal display panel when manufactured or used and electric charges externally electrified and (ii) allocation of a contact area for the conducting connection.

Means to Solve the Problems

A display includes: a liquid-crystal display panel including a transparent electrode layer on a display surface side, the liquid-crystal display panel displaying an image in an in-plane switching mode or a fringe-field switching mode; a protective plate that protects the liquid-crystal display panel on the display surface side of the liquid-crystal display panel; an electrode layer disposed on a rear surface of the protective plate that is a surface closer to the liquid-crystal display panel; and a conductive substance that connects the transparent electrode layer formed on the liquid-crystal display panel to the electrode layer disposed on the rear surface of the protective plate.

Effects of the Invention

In the display according to the present invention that causes an electric field generated in a transverse or diagonal direction to drive liquid crystals, a conducting connection capable of dissipating static electricity generated in a liquid-crystal display panel when manufactured or used and electric charges externally electrified is formed to enable allocation of a contact area for the conducting connection.

The objects, features, aspects and advantages of the present technique will become more apparent from the following detailed description and the accompanying drawings.

BRIEF DESCRIPTION OF DRAWINGS

FIG. 3 is an exploded perspective view of the display according to Embodiment 1.

FIG. 8 illustrates a cross section of a display according to Embodiment 3.

FIG. 9 illustrates a cross section of a display according to Embodiment 4.

DESCRIPTION OF EMBODIMENTS

Embodiment 1

Figure 1:
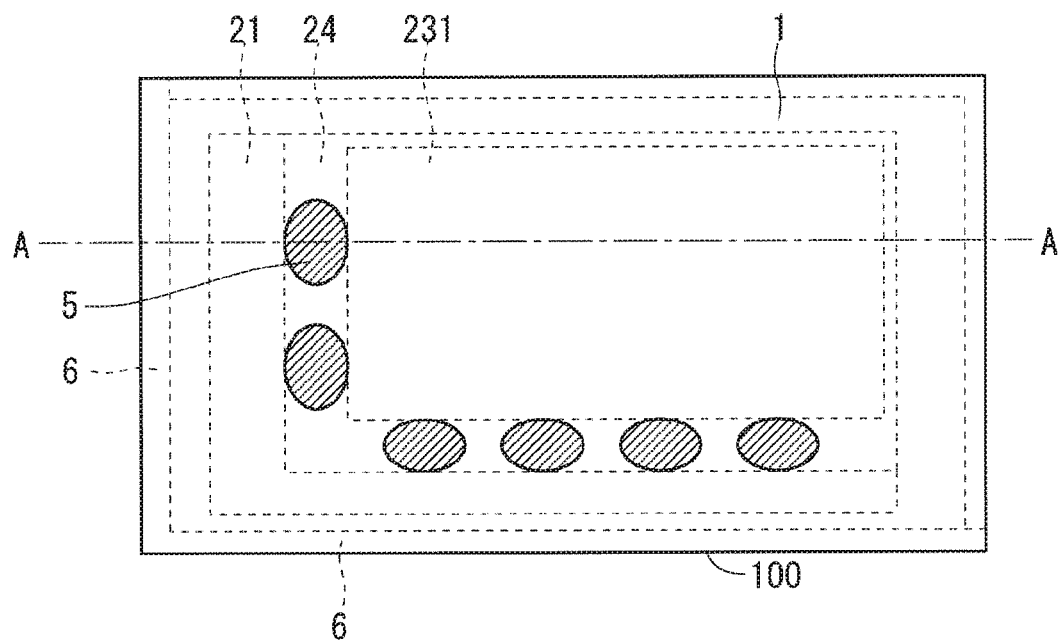
FIG. 1 is a plan view of a display according to Embodiment 1.
Figure 2:
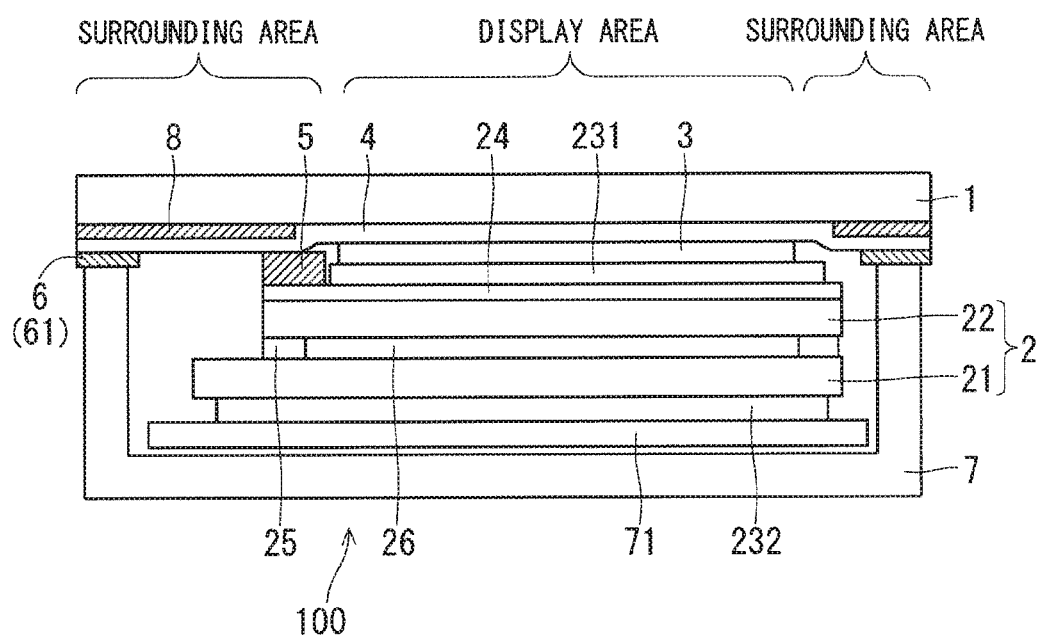
FIG. 2 illustrates a cross section AA in the display of FIG. 1.

An embodiment of the present invention will be hereinafter described with reference to the drawings. FIG. 1 is a plan view of a display according to Embodiment 1. FIG. 2 illustrates a cross section A-A in the display of FIG. 1. FIG. 3 is an exploded perspective view of the display according to Embodiment 1.

As illustrated to FIGS. 1 to 3, the display 100 according to Embodiment 1 includes a liquid-crystal display panel 2 that displays an image. The liquid-crystal display panel 2 includes a TFT substrate 21 including TFTs that are switching elements for driving liquid crystals, and a counter substrate 22 facing the TFT substrate 21. A sealant 25 maintains a predetermined spacing between the TFT substrate 21 and the counter substrate 22. Liquid crystals 26 are sealed into the spacing portion. A transparent electrode layer 24 that is a transparent electrode made of, for example, ITO is firmed on a surface of the counter substrate 22 that is opposite to a surface of the counter substrate 22 on which the liquid crystals 26 are disposed. Furthermore, an upper polarizing plate 231 and a lower polarizing plate 232 are bonded together to sandwich these two substrates. The upper polarizing plate 231 is disposed smaller in size than the transparent electrode layer 24 formed on the counter substrate 22, and exposes a part of the transparent electrode layer 24.

The display 100 according to Embodiment 1 uses the liquid-crystal display panel 2 of the in-plane switching mode or the fringe-field switching mode with wide viewing angle characteristics. The liquid-crystal display panel 2 of the in-plane switching mode or the fringe-field switching mode causes an electric field generated in a transverse or diagonal direction in a plane of the TFT substrate 21 with an array of the TFTs to drive the liquid crystals 26.

A protective plate 1 according to Embodiment 1 protects the liquid-crystal display panel 2 on a display surface side of the liquid-crystal display panel 2. An electrode layer 4 that is a set of a transparent electrode and a transparent conductive layer that are made of, for example, ITO is formed on a surface of the protective plate 1 that faces the counter substrate 22, that is, on almost the entirety of the rear surface which is opposite to the display surface. The electrode layer 4 formed on the rear surface of the protective plate 1 and the upper polarizing plate 231 of the counter substrate 22 are bonded together with a transparent adhesive 3 to fix the protective plate 1 to the liquid-crystal display panel 2. Examples of the transparent adhesive 3 include sorts of optical clear adhesive (OCA) and sorts of optical clear resin (OCR) all of which have been processed into sheets, and either of them may be used as the transparent adhesive 3. Embodiment 1 adopts the OCA. As illustrated in FIG. 2, designed print 8 is formed in a surrounding area outside of a display area by printing with, for example, a colored ink to shield light from a backlight 71 to be described later.

Conductive substances 5 are disposed in an area where the transparent electrode layer 24 on the counter substrate 22 of the liquid-crystal display panel 2 is exposed, to overlap the transparent electrode layer 24 on the counter substrate 22 and the electrode layer 4 formed on the rear surface of the protective plate 1. The conductive substances 5 electrically connect the electrode layer 4 and the transparent electrode layer 24 accordingly. Furthermore, the electrode layer 4 of the protective plate 1 includes a GND connecting part 6 to be connected to GND in the surrounding area. At least one of the conductive substances 5 that connect the transparent electrode layer 24 to the electrode layer 4 formed on the rear surface of the protective plate 1 is disposed in the vicinity of the GND connecting part 6. As illustrated in FIG. 1, a plurality of the conductive substances 5 are disposed in the display 100 according to Embodiment 1. The conductive substances 5 may be any substances with conductivity, and, for example, a silver paste is used.

The display 100 according to Embodiment 1 also includes a casing 7 that is formed of a material including a metal and that covers the backlight 71 and the liquid-crystal display panel 2. The casing 7 is fixed to the rear surface of the protective plate 1. In the display 100 according to Embodiment 1, the casing 7 is fixed to the surrounding area of the rear surface of the protective plate 1 by, for example, a double-faced tape 61. A conductive tape is used as the double-faced tape 61 in the vicinity of the surrounding area in which the conductive substances 5 are disposed. The double-faced tape 61 that connects the casing 7 formed of the material including the metal is regarded as the GND connecting part 6.

Figure 4:
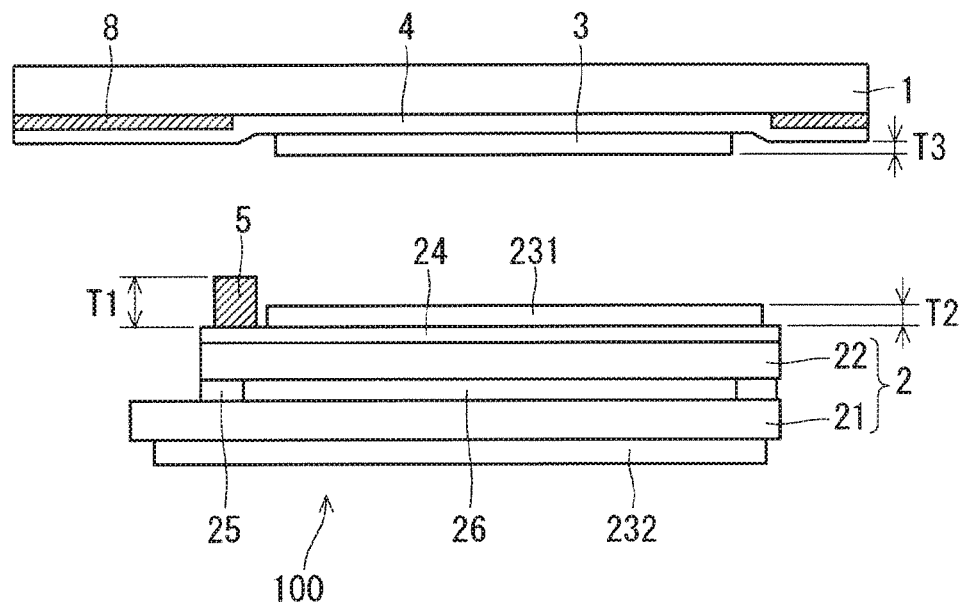
FIG. 4 is a cross section illustrating a method for manufacturing the display according to Embodiment 1.

A method for forming the conductive substances 5 will be described with reference to a cross section of the display 100 in FIG. 4. As illustrated in FIG. 4, the conductive substance 5 is disposed on an exposed portion of the transparent electrode layer 24 on the counter substrate 22 when the liquid-crystal display panel 2 and the protective plate 1 are bonded together. When T1 denotes a thickness (height) of the conductive substance 5 in an up-down direction of the paper, a relationship between a thickness 12 (approximately 0.1 to 0.3 mm) of the upper polarizing plate disposed above the counter substrate 22 of the liquid-crystal display panel 2 and a thickness T3 (approximately 0.1 to 1.0 mm) of the transparent adhesive 3 satisfies T1≥T2+T3.

In other words, the thickness T1 of the conductive substance 5 in the up-down direction of the paper is set larger than a sum of the thickness T2 of the upper polarizing plate and the thickness T3 of the transparent adhesive. When the thickness T1 of the conductive substance 5 is set thinner than the sum of the thickness T2 of the upper polarizing plate and the thickness T3 of the transparent adhesive 3, in some cases, the transparent electrode layer 24 on the counter substrate 22 is not connected to the electrode layer 4 of the protective plate 1, and there is no continuity between them. Thus, the thickness T1 is set sufficiently larger than the sum so that the liquid-crystal display panel 2 and the protective plate 1 can be electrically connected when they are bonded together.

After disposing the conductive substance 5, the protective plate 1 and the liquid-crystal display panel 2 are bonded with the transparent adhesive 3 to be fixed. Thus, the electrode layer 4 formed on the rear surface of the protective plate 1 is connected to the transparent electrode layer 24 on the liquid-crystal display panel 2 through the conductive substance 5 as well as the protective plate 1 and the liquid-crystal display panel 2 are fixed.

Figure 5:
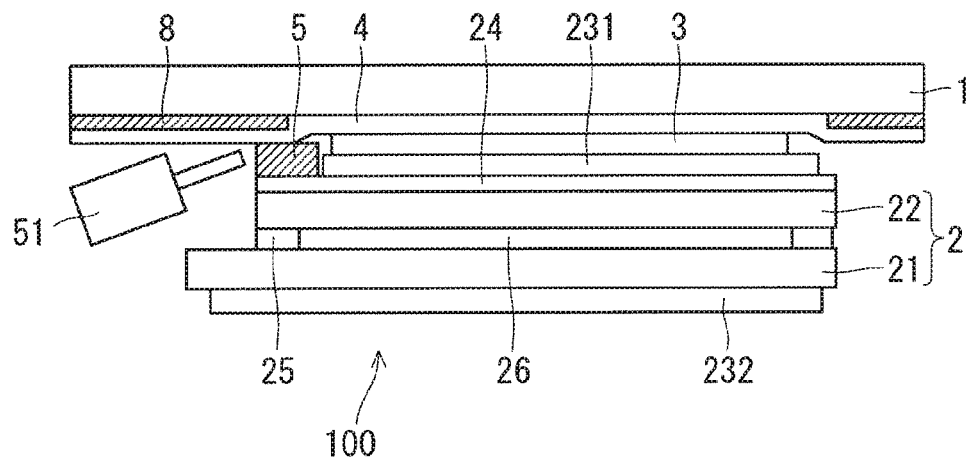
FIG. 5 is a cross section illustrating the method for manufacturing the display according to Embodiment 1.

FIG. 5 illustrates a modification of the method for forming the conductive substance 5 according to Embodiment 1. As illustrated in FIG. 5, the conductive substance 5 may be disposed in a space between the transparent electrode layer 24 of the liquid-crystal display panel 2 and the electrode layer 4 of the protective plate 1 after bonding the liquid-crystal display panel 2 and the protective plate 1 together. Here, the conductive substance 5 needs to be disposed in contact with the transparent electrode layer 24 on the counter substrate 22 of the liquid-crystal display panel 2 and the electrode layer 4 of the protective plate 1. Thus, disposing the conductive substance 5 in the space between the transparent electrode layer 24 of the liquid-crystal display panel 2 and the electrode layer 4 of the protective plate 1 using, for example, a dispenser 51 enables the electrical connection.

According to the method above, the transparent electrode layer 24 on the counter substrate 22 and the electrode layer 4 of the protective plate 1 can be electrically connected to each other by disposing the conductive substance 5 between the transparent electrode layer 24 and the electrode layer 4. Furthermore, the GND connecting part 6 connects the electrode layer 4 of the protective plate 1 to a part of the casing 7 including the backlight 71, thus connecting the electrode layer 4 to the GND. According to Embodiment 1, the GND connecting part 6 is disposed on the rear surface of the protective plate 1 and in the surrounding area in which the electrode layer 4 is formed.

The GND connecting part 6 with less design constraints can be disposed in any portions. Thus, fewer constraints in position or area where the GND connecting part 6 is disposed can provide a connection to the GND with higher connection reliability.

As described above, the transparent electrode layer 24 is formed on a surface of the counter substrate 22 included in the liquid-crystal display panel 2 that is opposite to the surface on which the liquid crystals 26 are disposed, in the display 100 according to Embodiment 1. The electrode layer 4 is formed on the rear surface of the protective plate 1 disposed to face the counter substrate 22. The conductive substances 5 are disposed between the transparent electrode layer 24 and the electrode layer 4 to connect the transparent electrode layer 24 to the electrode layer 4. The GND connecting part 6 provided in the surrounding area of the protective plate 1 connects the electrode layer 4 formed on the protective plate 1 to, for example, the casing 7, thus connecting the electrode layer 4 to the GND.

According to the structure of Embodiment 1, the conductive substances 5 are disposed above the counter substrate 22 to connect the counter substrate 22 to ea surface of the protective plate 1. This structure enables electric charges to flow through the electrode layer 4 on the rear surface of the protective plate 1 via the transparent electrode layer 24 formed on the counter substrate 22 to dissipate the electric charges from the GND connecting part 6 in the in-plane switching mode or the fringe-field switching mode when, for example, static electricity occurs in a surface of the counter substrate 22 that is not in contact with the liquid crystals in manufacturing or using the liquid-crystal display panel 2.

Since the electrode layer 4 formed on the rear surface of the protective plate 1 is directly connected to the GND connecting part 6, even the electric charges externally electrified in the protective plate 1 can be dissipated to the GND through the GND connecting part 6. Thus, the electric charges externally electrified can be efficiently avoided without influencing the liquid-crystal display panel 2.

Since the conductive substances 5 for forming the conducting connection are disposed between the electrode layer 4 on the rear surface of the protective plate 1 and the transparent electrode layer 24 on the counter substrate 22 with less design constraints than the TFT substrate, a contact area for forming the conducting connection can be allocated. Thus, reliability of the conductive connection structure can be increased.

With the conductive connection structure of disposing the conductive substances 5 on the rear surface of the protective plate 1 above the counter substrate 22 with less design constraints, freedom of disposition of an area for forming the conductive connection structure can be improved. This makes it possible to provide a plurality of (a large number of) the conductive connection structures using the conductive substances 5, which can increase the reliability of the conductive connection structures.

The conductive substances 5 can be provided in a plurality of portions. Even when the connectivity of one of the conductive substances 5 is found defective, the connection reliability of the other conductive substances 5 can be maintained. Thus, the reliability of the conductive connection structures can be increased.

Figure 6:
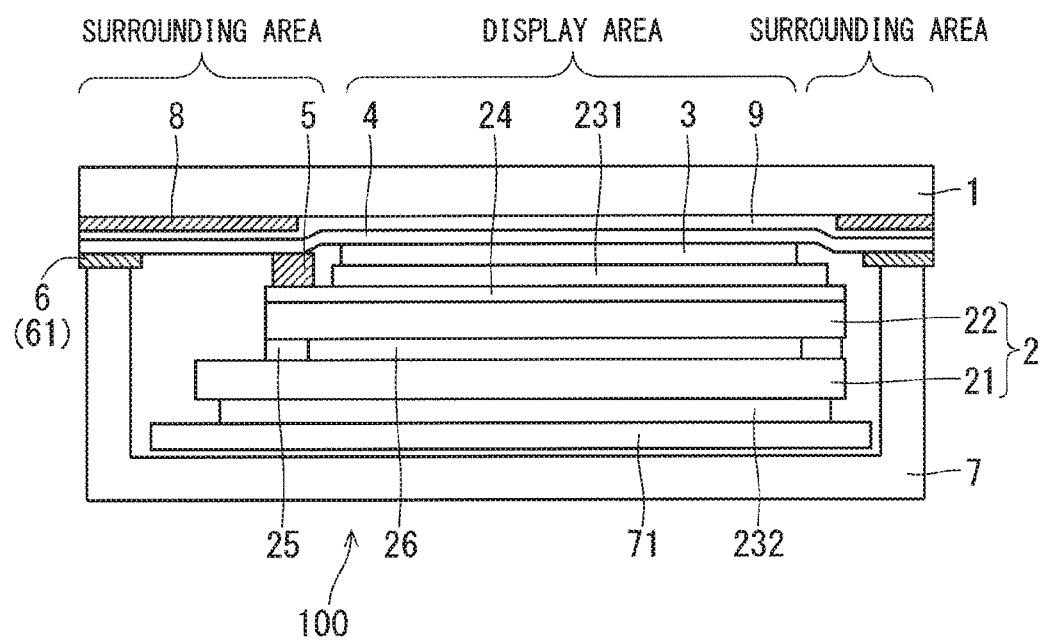
FIG. 6 illustrates a cross section of a display according to a modification of Embodiment 1.

FIG. 6 is a cross section illustrating a modification according to Embodiment 1. As illustrated in FIG. 6, an anti-reflection layer 9 differing in refractive index from the electrode layer 4 and the protective plate 1 is provided between the electrode layer 4 and the protective plate 1 on the rear surface of the protective plate 1 according to a structure of the modification.

Provision of the anti-reflection layer 9 can prevent increase in an external light reflectivity and decrease in a display light transmittance both of which are caused by the difference in refractive index between the protective plate 1 and the electrode layer 4 provided on the protective plate 1, thus enabling provision of the display 100 with higher display quality.

Embodiment 2

Figure 7:
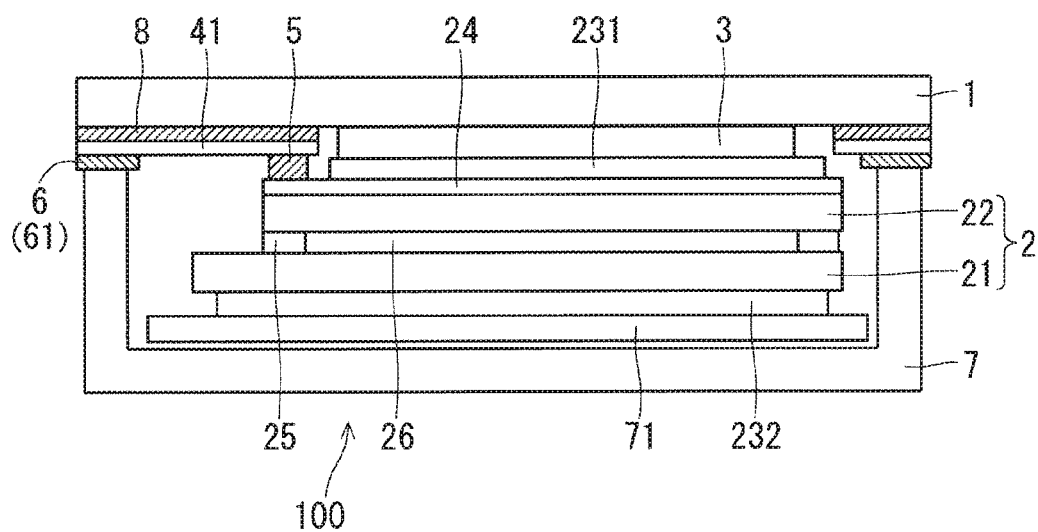
FIG. 7 illustrates a cross section of a display according to Embodiment 2.

FIG. 7 is a cross section schematically illustrating a structure according to Embodiment 2 to embody the present invention. Embodiment 1 describes an example of forming the electrode layer 4 that is a transparent electrode almost on the entirety of the rear surface of the protective plate 1, whereas the display 100 according to Embodiment 2 has a structure of forming an electrode layer 41 made of a material including a metal in the surrounding area of the protective plate 1 to overlap the rear surface of the designed print 8.

Thus, the electrode layer 41 is provided in the surrounding area of the protective plate 1 to overlap the designed print 8, and is connected to the transparent electrode layer 24 provided on the counter substrate 22 with the conductive substances 5. Such a structure enables use of an inexpensive metal material that is not a transparent material in the electrode layer 41, in addition to the structure according to Embodiment 1 enabling provision of the display 100 that is inexpensive and has higher display quality as well as the electrode layer 4 can prevent increase in an external light reflectivity and decrease in a display light transmittance in the display area. Since the electrode layer 4 does not need to be provided on the entirety of the rear surface of the protective plate 1, increase in the thickness of the display 100 can be prevented. Instead of the electrode layer 41, placement of a conductive tape including a metal foil, a conductive fiber, or a film whose surface has been subjected to a conductive process can produce the same advantages.

Embodiment 3

FIG. 8 is a cross section schematically illustrating a structure according to Embodiment 3 to embody the present invention. Embodiment 2 describes formation of the electrode layer 41 on the rear surface of the designed print 8 provided in the surrounding area of the protective plate 1, whereas Embodiment 3 describes providing, on the rear surface of the protective plate 1, a conductive design layer 10 that is a designed print layer made of, for example, a conductive resin or a conductive ink without providing the designed print 8.

Such provision of the conductive design layer 10 having both functions of the designed print 8 and the electrode layer 41 can reduce the fabrication processes. Moreover, the display portion can prevent increase in the external light reflectivity and decrease in the display light transmittance that are caused by the transparent electrode layer 24, thus making it possible to provide the display 100 that is more inexpensive and has higher display quality.

Embodiment 4

FIG. 9 is a cross section schematically illustrating a structure according to Embodiment 4 to embody the present invention. In Embodiment 4, a conductive frame 11 made of a conductive resin is integrally molded with the surrounding area of the protective plate 1.

Providing the integrally-molded conductive frame 11 with the protective plate 1 and forming a boss or a hook on a surface of the conductive frame 11 facing the casing 7 with the backlight to merely mate the conductive frame 11 with the casing 7 enables provision of the display 100 having a strong GND connection and higher display quality.

Embodiments or the modifications described above can be appropriately combined without departing from the scope of the present invention.

Although the present invention is described in details, the description is in all aspects illustrative and does not limit the present invention. Therefore, numerous modifications that have yet been exemplified will be devised within the scope of the present invention.

EXPLANATION OF REFERENCE SIGNS

1 protective plate, 2 liquid-crystal display panel, 21 TFT substrate, 22 counter substrate, 24 transparent electrode layer, 26 liquid crystals, 3 transparent adhesive, 4 electrode layer, 5 conductive substance, 6 GND connecting part, 61 double-faced tape, 7 casing, 71 backlight, 8 designed print, 9 anti-reflection layer, 10 conductive design layer, 11 conductive frame, 231, 232 polarizing plate, 25 sealant, 100 display.

The invention claimed is:

1. A display, comprising:
a liquid-crystal display panel including a transparent electrode layer on a display surface side, said liquid-crystal display panel displaying an image in an in-plane switching mode or a fringe-field switching mode;
a protective plate that protects said liquid-crystal display panel from said display surface side;
an electrode layer formed on a rear surface of said protective plate to correspond to an area in which said transparent electrode layer of said liquid-crystal display panel is formed and to a surrounding area of said liquid-crystal display panel, said rear surface being a surface opposite to said display surface side; and
a conductive substance that connects said transparent electrode layer formed on said liquid-crystal display panel to said electrode layer disposed on said rear surface of said protective plate, wherein
a distance between a surface of said electrode layer facing said conductive substance and a surface of said transparent electrode layer facing said conductive substance is the same as the thickness of said conductive substance in the first part and longer than the thickness of said conductive substance in the second part.

2. The display according to claim 1, wherein
said electrode layer formed on said protective plate includes a transparent material, and is disposed on an entirety of said rear surface of said protective plate, and
an anti-reflection layer is disposed at least in a display area of said display between said protective plate and said electrode layer, said anti-reflection layer differing in refractive index from said protective plate and said electrode layer.

3. The display according to claim 1, wherein said electrode layer formed on said protective plate is electrically connected to a casing that covers said protective plate and said liquid-crystal display panel, said casing including a conductive material.

4. The display according to claim 3, wherein
said protective plate and said liquid-crystal display panel are fixed to each other with an adhesive.

5. A display, comprising:
a liquid-crystal display panel including a transparent electrode layer on a display surface side, said liquid-crystal display panel displaying an image in an in-plane switching mode or a fringe-field switching mode;
a protective plate that protects said liquid-crystal display panel on said display surface side of said liquid-crystal display panel;
a casing that covers said protective plate and said liquid-crystal display panel, said casing including a conductive material;
a conductive substance that connects said transparent electrode layer formed on said liquid-crystal display panel to a conductive frame that is integrally formed in an outer edge of said protective plate and can mate with said casing; and
a boss or a hook on a surface of said conductive frame facing said casing, wherein
at least three sides of said boss or said hook are formed in contact with a corresponding three sides within an interior receiving space formed in said casing when viewed in a side cross-sectional view, such that
static electricity from said liquid-crystal display panel is dissipated into said casing.

* * * * *